(12) United States Patent
Fink

(10) Patent No.: US 6,373,986 B1
(45) Date of Patent: Apr. 16, 2002

(54) COMPRESSION OF DATA TRANSMISSION BY USE OF PRIME EXPONENTS

(75) Inventor: Ronald Fink, Huntingdon Valley, PA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/056,987

(22) Filed: Apr. 8, 1998

(51) Int. Cl.[7] .................................................. G06K 9/36
(52) U.S. Cl. ...................................... 382/232; 382/249
(58) Field of Search ............................. 382/232, 239, 382/233, 234, 235, 281, 249, 248, 247, 251, 250; 380/281, 30, 29, 255, 28; 348/467; 455/352; 370/235, 395; 364/715; 711/202; 341/105, 106; 708/491

(56) References Cited

U.S. PATENT DOCUMENTS

| | | | |
|---|---|---|---|
| 4,077,034 A | | 2/1978 | Dell ............................ 340/347 |
| 4,164,023 A | | 8/1979 | Whitehouse et al. ........ 364/862 |
| 4,588,985 A | | 5/1986 | Carter et al. |
| 5,095,480 A | * | 3/1992 | Fenner ....................... 370/94.1 |
| 5,140,634 A | | 8/1992 | Guillou ......................... 380/23 |
| 5,218,637 A | | 6/1993 | Angebaud et al. ............ 380/23 |
| 5,257,270 A | * | 10/1993 | Hilden et al. ................ 371/37.1 |
| 5,384,725 A | | 1/1995 | Coifman et al. ............. 364/807 |
| 5,519,780 A | * | 5/1996 | Woo et al. ...................... 380/49 |
| 5,526,054 A | * | 6/1996 | Greenfield et al. .......... 348/467 |
| 5,548,646 A | | 8/1996 | Aziz et al. ...................... 380/23 |
| 5,708,659 A | | 1/1998 | Rostocker et al. ........... 370/392 |
| 5,712,800 A | * | 1/1998 | Aucsmith ...................... 380/30 |
| 5,745,392 A | * | 4/1998 | Ergas et al. ............ 364/715.02 |
| 5,771,227 A | * | 6/1998 | Benayoun et al. ........... 370/235 |
| 5,790,599 A | * | 8/1998 | Wright, Jr. et al. .......... 375/240 |

(List continued on next page.)

FOREIGN PATENT DOCUMENTS

WO     WO 94/0394     2/1994

OTHER PUBLICATIONS

Ramesh R. Sarukkai, "Prime numbers an output codes", IEEE 1995.*
Tahir, et al., "Algorithm–based fault detection in prime factor FFT networks", IEEE 1995.*
Whalen et al., "Prime perfect digital invariants", Baywood publishing Co., Inc., 1993.*

Primary Examiner—Leo Boudreau
Assistant Examiner—Amir Alavi
(74) Attorney, Agent, or Firm—Lowe Hauptman Gopstein Gilman & Berner, LLP

(57) ABSTRACT

A method of compressing data utilizes the prime number series to generate unique compression parameters that may be used to recover an original data stream. The original data is converted from a binary form to a decimal form. Various compression parameters are selected to initialize the system. The compression parameters include the number of prime numbers which will be used in the compression process and an exponential value corresponding to each prime number. A header is constructed which includes the compression parameters. The data is compressed by a compression algorithm which performs successive division operations by the series of prime numbers selected. The compression algorithm generates a plurality of exponential values corresponding to each of the prime numbers. The header is then assembled with the exponential values and transmitted to a receiving station. In decompressing the data, the prime numbers are raised to the exponential value generated by the compression algorithm, and their product is taken. A fault parameter may be generated to compensate for numbers not readily divisible by the prime number selected in the initialization parameters.

13 Claims, 7 Drawing Sheets

U.S. PATENT DOCUMENTS

| | | | | |
|---|---|---|---|---|
| 5,832,126 A | * | 11/1998 | Tanaka | 382/239 |
| 5,842,224 A | * | 11/1998 | Fenner | 711/202 |
| 5,856,975 A | * | 1/1999 | Rostoker | 370/395 |
| 5,857,025 A | * | 1/1999 | Anderson et al. | 380/28 |
| 5,862,452 A | * | 1/1999 | Cudak et al. | 455/6.3 |
| 5,864,554 A | * | 1/1999 | Rostoker et al. | 370/395 |
| 5,914,955 A | * | 6/1999 | Rostoker et al. | 370/395 |
| 5,974,151 A | * | 10/1999 | Slavin | 380/30 |
| 6,069,572 A | * | 5/2000 | Chambers | 341/10 |
| 6,081,597 A | * | 6/2000 | Hoffstein et al. | 380/28 |
| 6,163,790 A | * | 12/2000 | Monier | 708/491 |
| 6,275,587 B1 | * | 8/2001 | Amerige | 380/255 |

* cited by examiner

COMPRESSION OF DATA TRANSMISSION BY USE OF PRIME EXPONENTS

BACKGROUND OF THE INVENTION

1. Technical Field

The present invention relates to data compression and decompression techniques and more particularly to a method of compressing and/or decompressing data using a prime number series.

2. Description of the Related Art

Increased bandwidth is needed for the transfer and storage of data. Increased use of data in real time, however, requires maximum transfer rates with minimum data loss due to processing errors. This requirement has given rise to increased applications involving data compression.

While many advances have been made in processing speed and data compression techniques, improvements in processing speed have greatly outpaced improvements related to data compression. In addition, the limited bandwidth available for transmitting data in modem communication systems has placed an ever increasing reliance on effective data compression techniques.

There are presently two general categories of data compression, namely, lossless and lossy. Lossless data compression techniques are designed to remove data redundancy without any data loss. On the contrary, lossy compression techniques remove both redundant data and data judged to be insignificant, according to predetermined criteria specific to the data application.

Although lossless compression techniques have become increasingly efficient, the amount of lossless compression possible in many applications is limited. For image compression, a maximum compression ratio of 2:1 or less is typically realized. Lossy data compression techniques are capable of substantially greater compression ratios in applications involving real time series representation of analog signals (such as speech or music) and two dimensional arrays representing images (still motion or video), wherein a portion of the data can be thrown away without noticeable errors during reconstruction. Still further compression benefits can be obtained by varying the degree of tolerance with respect to detectable errors in the reconstruction phase, depending upon the particular application.

One feature common to both lossless and lossy compression techniques is the restriction placed by available bandwidth. In most applications where data is compressed prior to transfer, the transmission time, generally a function of bandwidth, is the controlling factor. Once the data is received, decompression is typically a simple task due to the high speed of current processing units executing the inverse of the data compression routine. Consequently, a lot of time is spent transmitting and receiving data over limited bandwidths. Therefore, a system for compressing and decompressing data which utilizes minimum bandwidth while maximizing use of processor speed would be desirable.

SUMMARY OF THE INVENTION

Accordingly, it is a principle object of the invention to provide a method of compressing data which minimizes required bandwidth while fully utilizing modern processing capabilities.

It is another object of the invention to provide a method of decompressing data which minimizes bandwidth while maximizing use of processor speed.

It is a further object of the invention to provide a system for transmitting compressed data.

It is a still further object of the invention to provide a method of transmitting compressed data in real time.

In accordance with an object of the invention, a method of compressing data comprises: selecting at least one compression parameter to initialize a system having a data stream to be compressed, including a key parameter corresponding to a predetermined number of prime numbers to be used in the compression process; constructing a header containing the compression parameters; transferring the header to a compression buffer; transferring the data stream to the compression buffer, and compressing the contents of the compression buffer into a compressed data block based on the compression parameters. Compression of the data stream utilizes the prime number series and their exponents in order to provide lossless data compression with a high compression ratio. The resulting compressed data block and the header contain initialization parameters sufficient to reconstruct the data stream. As a result, the bandwidth required for data transmission is minimized while computation requirements are increased.

If the data to be compressed cannot be stored in the compression buffer, then the method of compressing further includes segmenting the data stream, prior to the step of transferring, into one or more data blocks according to the compression parameters; and assembling the one or more compressed data blocks, subsequent to the compressing step, into a compressed data stream.

In accordance with another object of the invention, a method of decompressing data comprises: retrieving at least one compression parameter from a header associated with a compressed data block, including a key parameter corresponding to a predetermined number of prime numbers used to compress the data; transferring the compressed data block to an analysis buffer; and decompressing the contents of the analysis buffer into a decompressed data block according to the compression parameters. Retrieving compression parameters generated during the data compression phase allows lossless reconstruction of the original data without heavy requirements on bandwidth during transmission. If the data is in the form of a compressed data stream which was segmented prior to compression, then the method of decompression further comprises segmenting the compressed data into one or more compressed data blocks in accordance with the compression parameters retrieved from the header; and assembling one or more decompressed data blocks, resulting from the step of decompressing, into a data stream.

In accordance with another object of the invention, a system for transmitting compressed data comprises an encoder for retrieving data to be transmitted, a transmitting device for transmitting a header and a compressed data stream, a data receiving device for receiving the header and the compressed data stream, and a decoder for retrieving the header and the compressed data stream from the receiving device.

The encoder is configured to construct the header which contains a plurality of compression parameters, including a prime parameter corresponding to the number of prime numbers to be used in the compression algorithm, a limit parameter corresponding to a predetermined exponent value to be used in conjunction with the prime numbers, and a size parameter corresponding to the size of the largest set of bytes which may be compressed during each cycle.

The encoder is further configured to segment the data stream into one or more data blocks of predetermined length according to the size parameter, upon determining that the size of the data stream exceeds the size parameter, compress each of the one or more data blocks according to the compression parameters to form one or more compressed data blocks, generate an exponential parameter for each of the one or more compressed data blocks, and assemble the one or more compressed data blocks into a compressed data stream.

The decoder is configured to retrieve the compression parameters from the header, segment the compressed data stream into or more compressed data blocks according to the compression parameters received, decompress each of the one or more compressed data blocks to obtain one or more decompressed data blocks, and reassemble the one or more decompressed data blocks into the data originally retrieved by the encoder.

The present communication system provides reliable lossless data compression, minimizes bandwidth, and exploits the advantage of current processing units. The system may be used over a variety of communication networks including circuit switched, packet switched, wired, and wireless. Furthermore, the system may be used in real time using semiconductor devices to implement the compression and decompression algorithms.

BRIEF DESCRIPTION OF THE DRAWINGS

For a more complete understanding of the present invention and the advantages thereof, reference is now made to the following description taken in conjunction with the accompanying drawings in which like numbers designate like parts and in which.

DETAILED DESCRIPTION OF THE DRAWINGS

The present invention will be described with an illustrative example of compression and decompression of a data stream. A description will first be given of general computer hardware capable of implementing the invention, followed by the general procedure for compressing and decompressing data. It will become apparent, however, that the present invention is also applicable to various data transmission and communication systems.

Computer Hardware Overview

Figure 1:
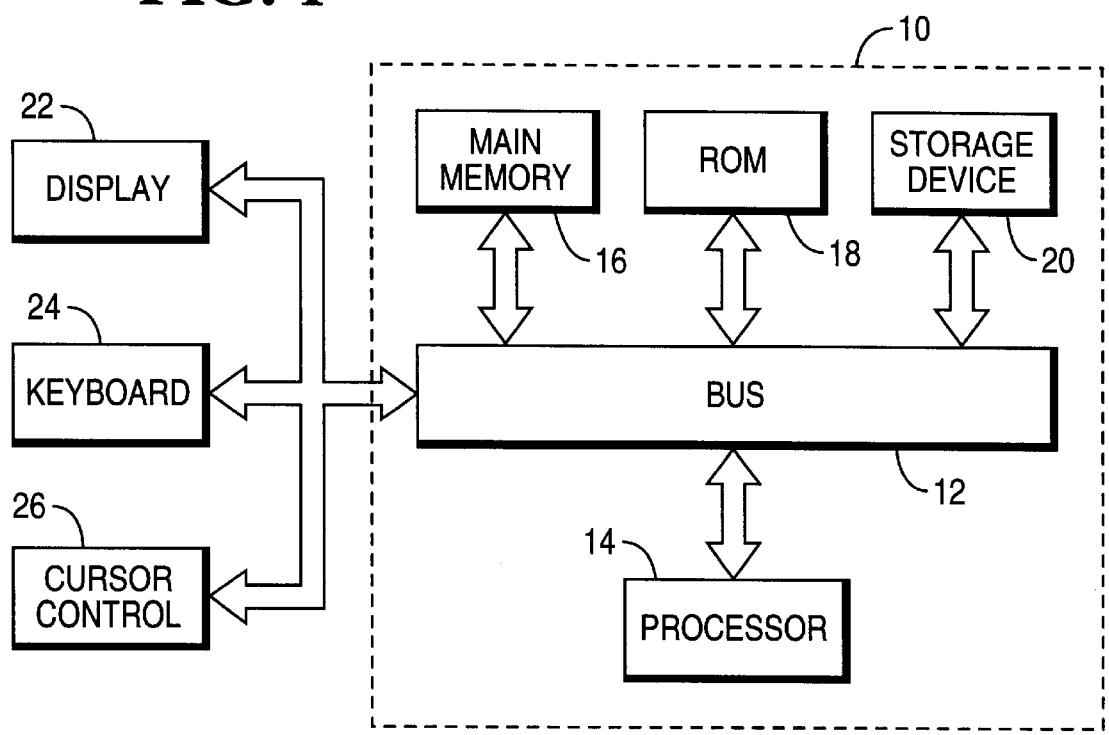
FIG. 1 is a block diagram illustrating a computer system which may be used to implement the present invention.

Referring to FIG. 1, a computer system 10 upon which an embodiment of the present invention can be implemented is illustrated. The computer system 10 comprises a bus 12 or other communication means for communication information. The computer system 10 further comprises a random memory (RAM) or other dynamic storage device 16 (referred to as main memory), coupled to the bus 12 for storing information and instructions to be executed by the processor 14. The main memory 16 may also be used for storing temporary variables or other intermediate information during execution of instructions by the processor 14. The computer system 10 also comprises a read only memory (ROM) and/or other static storage device 18 coupled to the bus 12 for storing static information and instructions for the processor 14. A data storage device 20 is coupled to the bus 12 for storing information and instructions.

A data storage device such as magnetic disk or optical disk and its corresponding disk drive can be coupled to the computer system 10. The computer system 10 can also be coupled via the bus 12 to a display device 22, such as a cathode ray tube (CRT), for displaying information to a computer user. An alphanumeric input device 24, including alphanumeric and other keys, is typically coupled to the bus 12 for communicating information and command selections to the processor 14. Another type of user input device is a cursor control 26 such as a mouse, a trackball, or cursor direction keys for communicating direction information and command selections to the processor 14 and for controlling cursor movement on the display 22. This input device typically has two degrees of freedom in two axes, a first axis (e.g., x) and a second axis (e.g., y) which allows the device to specify positions in a plane.

Alternatively, other input devices such as a stylus or pen can be used to interact with the display 22. A displayed object on a computer screen can be selected by using a stylus or pen to touch the displayed object. The computer detects the selection by implementing a touch sensitive screen. Similarly, a light pen and light sensitive screen can be used for selecting a displayed object. Such devices may thus detect selection position and the selection as a single operation instead of the "point and click", as in a system incorporating a mouse or trackball. Stylus and pen based input devices as well as touch and light sensitive screens are well known in the art. Such a system may also lack a keyboard such as alphanumeric input device 24 wherein all interface is provided via the stylus as a writing instrument (like a pen) and the written text is interpreted using optical character recognition (OCR) techniques.

The present invention is related to the use of computer system 10 for compressing and decompressing data. According to one embodiment, compression and decompression of data are performed by the computer system 10 in response to the processor 14 executing sequences of instructions contained in the memory 16. Execution of the sequences of instructions contained in the memory 16 causes the processor 14 to perform various calculations and manipulation of data as will be described hereafter. In alternative embodiments, semiconductor devices or microchips may be used in place of or in combination with software instructions to implement the present invention. Thus, the present invention is not limited to any specific combination of hardware circuitry and software.

Data Compression

Referring to FIGS. 2A–2E, a method is illustrated for compressing data in accordance with the present invention. At step S10, initialization of the system begins by selecting the maximum number of prime numbers (key parameter) to be used in the compression algorithm. At step S12, the maximum value for the exponents of the prime numbers (exponent parameter) is selected. The size of the largest set of bytes which will be compressed in a given cycle is selected at step S14. The various initialization parameters (or compression parameters) may be input by the user, or may be automatically selected based on predetermined conditions.

Once the initialization parameters have been selected, a header is constructed at step S16. Hence, the header advantageously contains three parameters which will be used to compress as well as properly decompress the data. The value selected for the initialization (compression) parameters can vary from system to system depending on the processing speed available. At step S18, the constructed header is transmitted. Depending on the type of communication network being used, a response may be desired prior to continuation of the data compression sequence. Alternatively, the header may be later assembled with the compressed data and transmitted.

At step S20, the receiver acknowledges receipt of the header. The compression cycle is now initiated. At step S22, shown in FIG. 2B, an array is created which contains the prime numbers that will be used in the compression algorithm. According to the invention, if the prime parameter selected is 5, then the prime array has a length of 5 and the values of the elements contained in the array correspond to [2, 3, 5, 7, 11].

At step S24, the initialization (compression) parameters are loaded into the memory of the computer, or system being used to compress the data stream, and the value of a counter (I) is set to 0. Depending on the size of the data stream to be compressed, it may be necessary to segment the data stream into multiple blocks of data according to the size parameter. This ensures that the size of the data will not exceed the limits of a compression buffer, which is used to store the data during the compression process. At step S26, the data stream is received into a receiving buffer. The data stream, or alternatively the first segmented data block, is transferred to the compression buffer. Once the compression buffer is filled, the data compression cycle begins. At step S28, FIG. 2C, the data in the compression buffer is divided by the first prime number. The first prime number corresponds to the first element in the prime array.

At step S30, the result of the division process is evaluated. If the remainder is 0, then a 1 is added to the exponent count of the prime number used to perform the division. If the remainder is not 0, then the counter is incremented by 1 at step S34. At step S36, the value of the counter is examined. If the value of the counter is equal to the value of the maximum number of prime numbers (key parameter) selected, then the fault value is incremented by one and the value of the counter is reinitialized. The value of the data in the compression buffer is adjusted in accordance with the Adjustment Algorithm. The Adjustment Algorithm is determined prior to the initialization. It can be a variety of operations. For the diagrams, a simple decrement is used. The program returns to step S28 where the content of the compression buffer is again divided by the first element of the prime array, i.e., the first prime number. If the counter is not equal to the value selected for the maximum number of primes (key parameter), then the program returns to step S28 where the contents of the compression buffer are divided by the next subsequent element of the prime array, i.e., the next prime number.

At step S40, the quotient of the division process is evaluated. If the quotient is less than the value of the largest prime number, then the program proceeds to step S46. If the quotient is larger than the value of the largest prime number, then the value of the counter is evaluated. If the value of the counter is equal to the value selected for the prime parameter minus 1, then the fault value is incremented and the counter is reset to 0. The program also applies the Adjustment Algorithm to the compression buffer. The program returns to step S28 and repeats the division sequence. If the counter is not equal to the maximum number of primes (prime parameter), then the program continues the division sequence without incrementing the fault value. The value of the compression buffer is substituted with the quotient of the division process each time the remainder is 0.

Figure 2A:
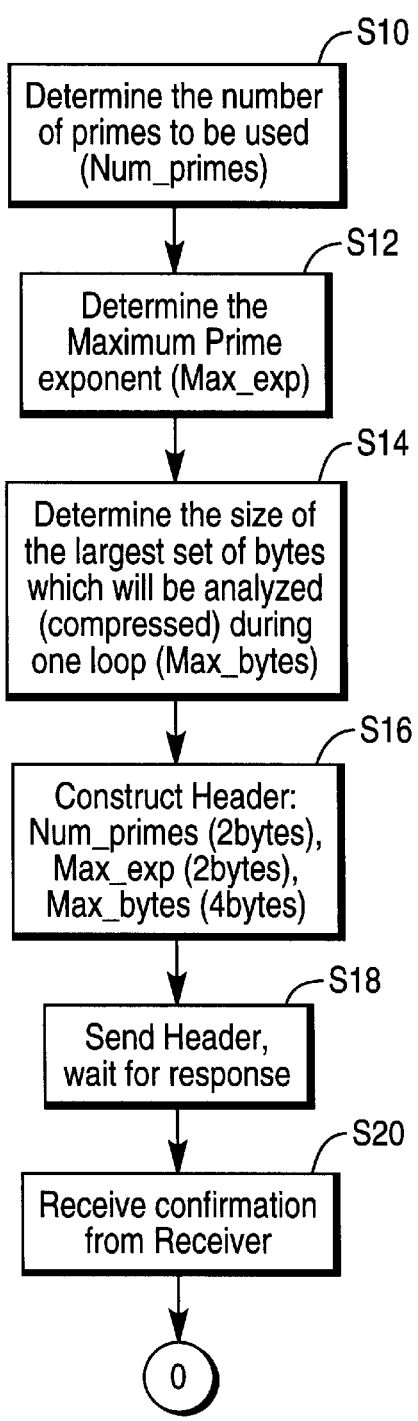
FIGS. 2A–2E are flow charts illustrating the detailed computer process for compressing data in accordance with the present invention.
Figure 2B:
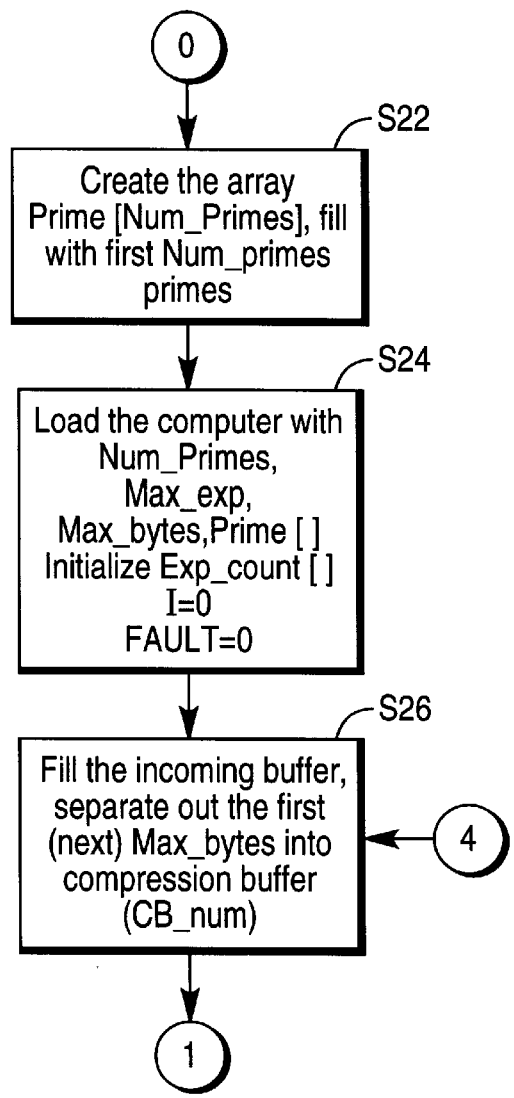
Figure 2C:
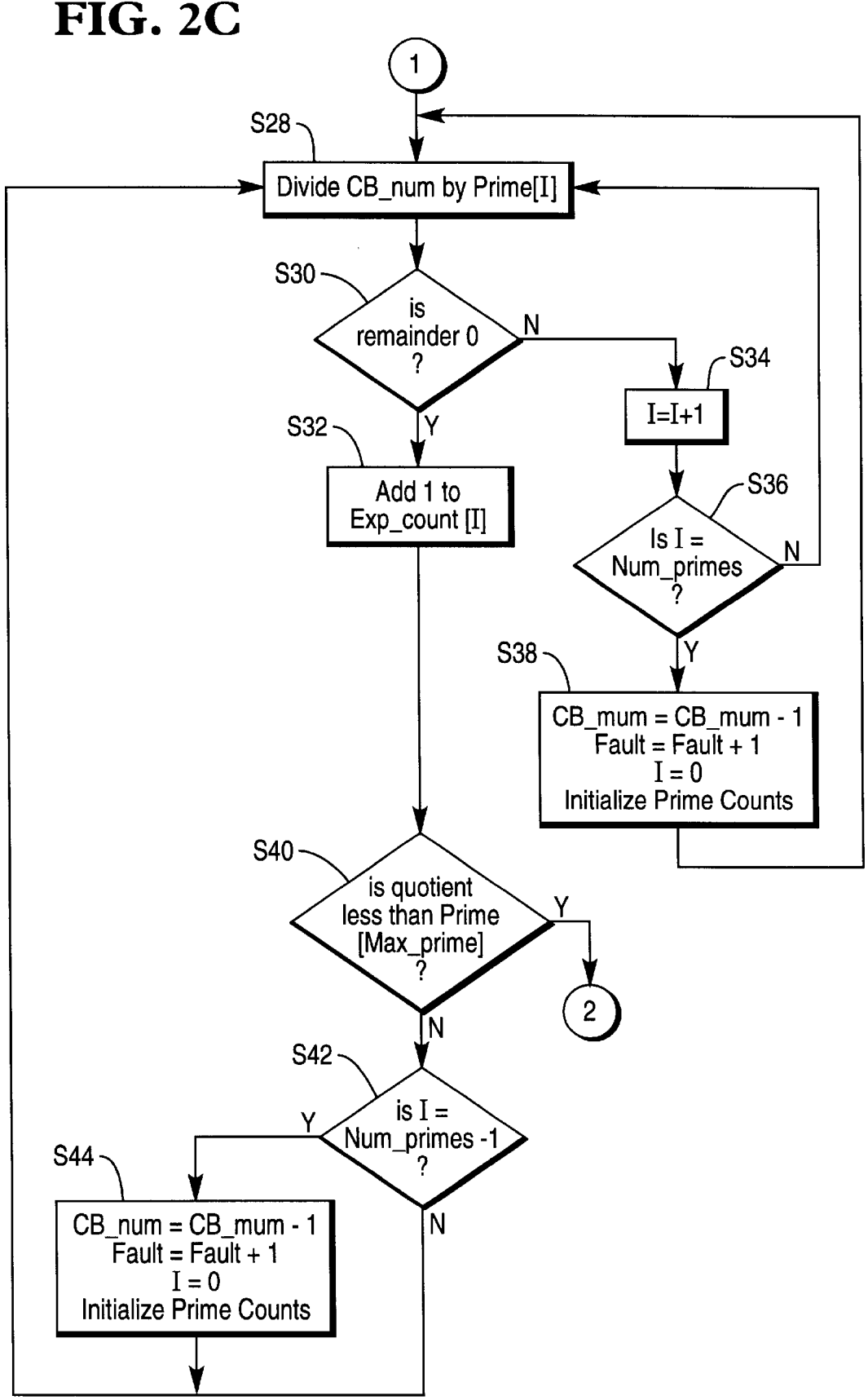
Figure 2D:
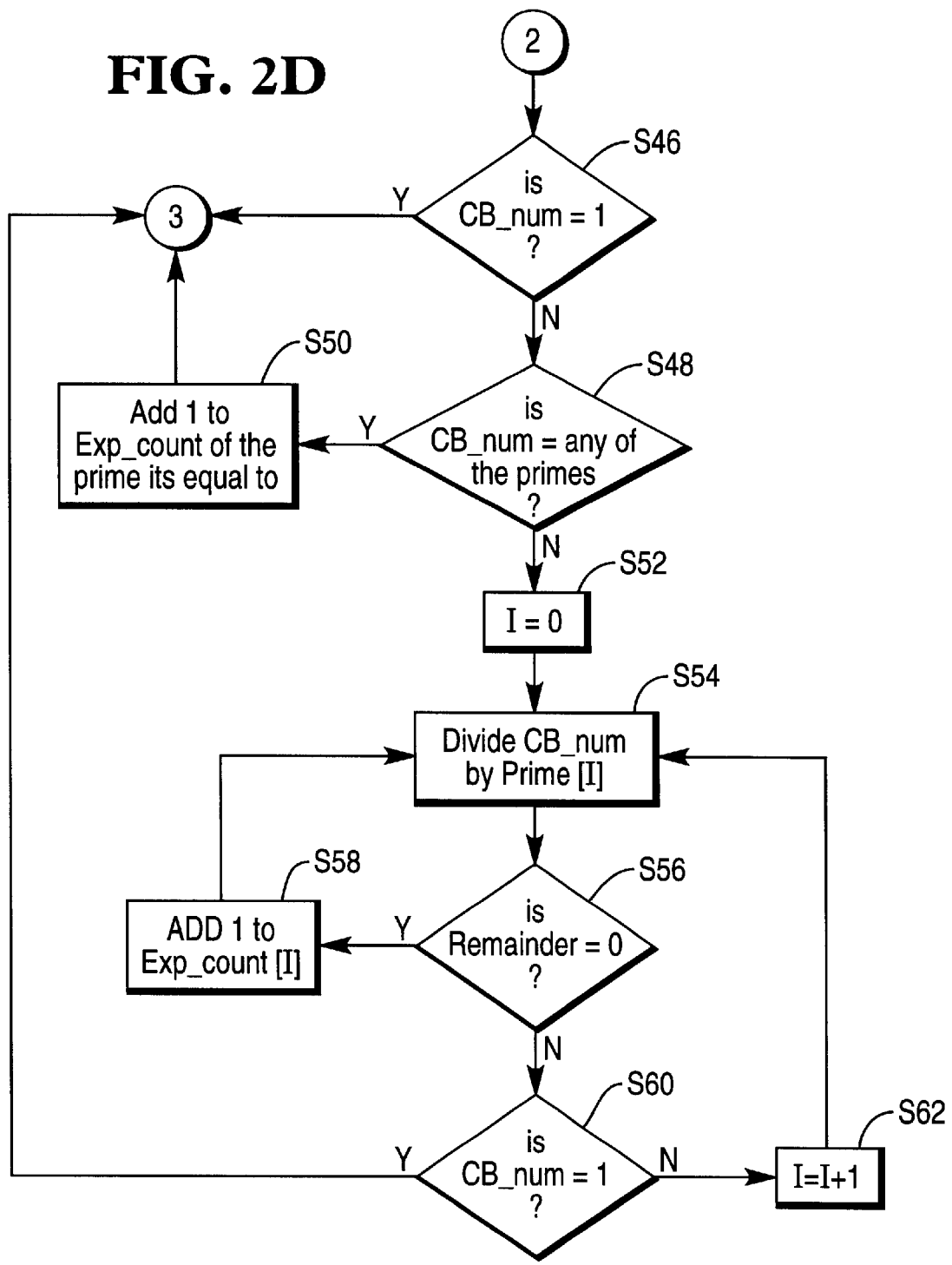

At step S46, FIG. 2D, the value of the compression buffer is evaluated. If the value is equal to 1, then the program moves to step S64. If the value of the compression buffer is not equal to 1, then it is compared to the elements of the prime array at step S48. Thus, the value of the compression buffer is compared to each of the prime numbers used in the compression algorithm. If the value of the compression buffer equals any of the prime numbers, then a 1 is added to the exponent count of the prime number at step S50. The program is then directed to step S64. If the value of the compression buffer is not equal to any of the prime numbers, then the counter is reset to 0 at step S52.

The value of the compression buffer is divided by the first prime number at step S54. At step S56, the result of the division is evaluated. If the remainder is 0, then a 1 is added to the exponent count of the prime number used in the division at step S58. The program returns to step S54 where the content of the compression buffer is again divided by the same prime number. If the remainder is not 0, then the content of the compression buffer is evaluated at step S60. If the content of the compression buffer is equal to 1, then the program jumps to step S64. If the content of the compression buffer is not equal to 1, then the counter is incremented by 1, and at step S62, the program returns to step S54. The division process is again repeated.

Figure 2E:
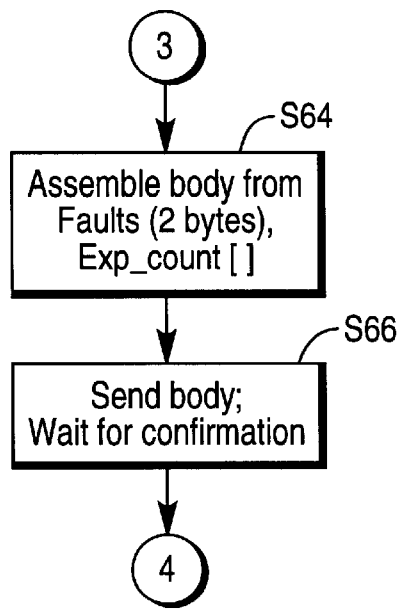

This process continues until the value of the compression buffer is equal to 1 and the program is allowed to proceed to step S64, FIG. 2E. The body of the data block is assembled at step S64 into a compressed data stream and transmitted to the receiver at step S66, thus completing the compression process. The compressed data stream is in the form of an array containing the exponent values for each of the prime numbers and the faults determined during the compression cycle. As previously mentioned, the compressed data stream may also include the header. If desired, confirmation may be obtained from the receiver to acknowledge receipt of the compressed data stream.

Data Decompression

Figure 3B:
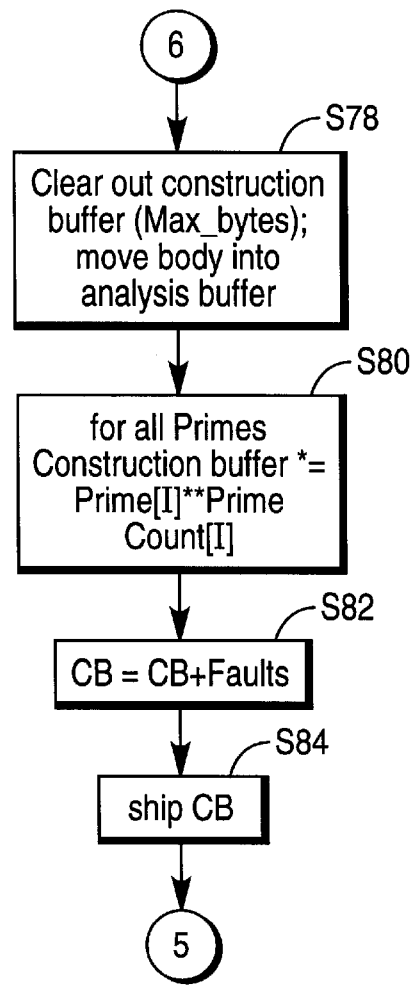
FIGS. 3A–3B are flow charts illustrating the detailed computer process for decompressing data in accordance with the present invention.
Figure 3A:
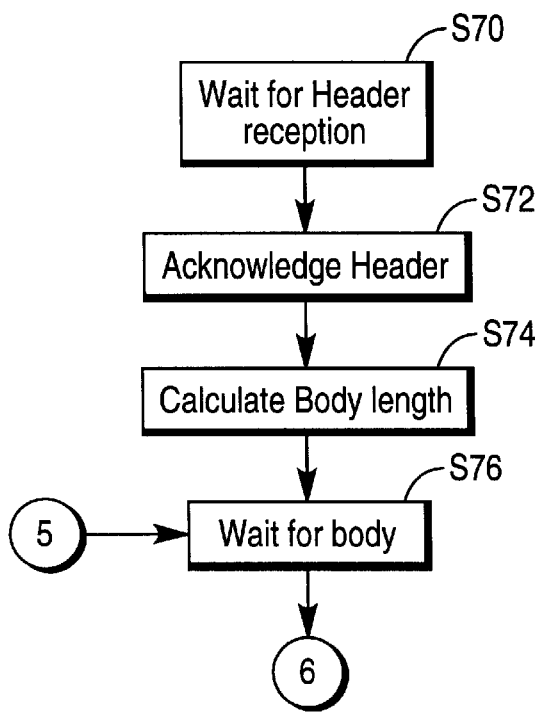

Turning now to FIGS. 3A and 3B, a method for decompressing data according the present invention is shown. At step S70, a header containing compression parameters is received by a receiving station. At step S72 acknowledgement of the header may be transmitted back to the transmitting station. At step S74, the body length of the data stream is calculated based on the compression parameters retrieved from the header. The receiver now awaits transmission of the data blocks at step S76.

The data block transmitted at step S76 is placed in a construction buffer until it is received in its entirety. At step S78, FIG. 3B, the contents of the data block are moved into an analysis buffer for decompression. At step S80, the data is decompressed by first raising each prime number to the exponent count determined in the compression phase. The resultant numbers from the exponential evaluation are then multiplied together and stored in the construction buffer. At step S82, the value of the fault parameter is added to the content of the construction buffer. In general, the Adjustment Algorithm is reversed a number of times specified in the fault parameter. If the Adjustment Algorithm is "decrement", the fault parameter can just be added. At this point, the original data stream has been reconstructed.

For example, suppose the prime numbers retrieved from the header are [2, 3, 5], the exponent counts generated are [3, 5, 2], and the fault parameter is 3. The decompressed data would be $(2^3)*(3^5)*(5^2)+3$, or 48603. At step S84 the data may be transmitted, in binary form, to the computer or appropriate system for analysis. If there are additional blocks to be decompressed the program returns to step S76 and repeats the decompression process.

Illustrative Example

Figure 4:
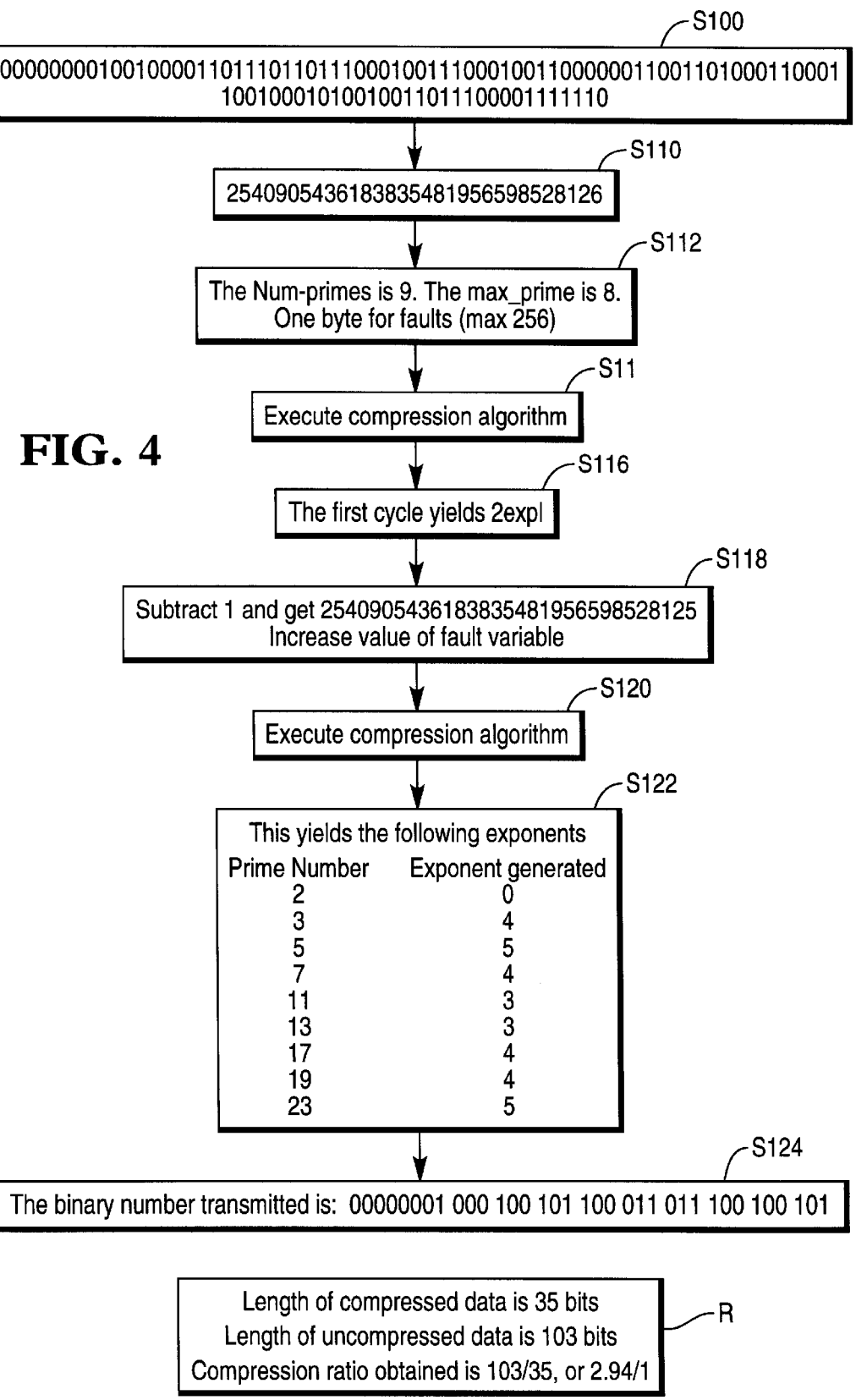
FIG. 4 is a block diagram illustrating the results of various steps during compression and decompression of data according to the present invention.

FIG. 4 illustrates the results of various steps during the compression of a data stream according to the present invention. The data to be transmitted is first selected at step S100. The data corresponds to a binary or text file stored in a system, digitally sampled signals, etc. During this step, the data is treated as a large stream of binary numbers. The data is converted to its equivalent decimal value at step S110 so that it may be compressed. Next, the number of prime numbers (key example) to be used in the algorithm and the maximum exponent (exponent parameters) for each prime number are selected at step S112. According to the example, one byte is allocated to store the value of the fault parameter. This may not be sufficient in real cases and the length of the fault field is an assumed value in both ends in the definition of the header. The initialization parameters correspond to values which would typically be encoded in the header transmitted to the receiving station. In addition, it is presumed that the numeric value of the data to be transmitted is within the limits of the compression buffer, thus, segmentation is not necessary.

The program proceeds with the compression algorithm at step 114 and divides the data by all the prime numbers. The first cycle yields a one for the exponent count of the first prime number at step S116. The remaining prime numbers can not be divided into the value of the data contained in the compression buffer without a remainder. Thus, a fault situation is created. At step S118, the value of the data in the compression buffer is decremented by 1, and the fault parameter is incremented by 1. At step S120, the compression algorithm is again applied, and the data is divided by all the prime numbers.

The results of the second cycle are illustrated at step S122. There is no exponential value generated for the first prime number. The second prime number generates an exponent of 4, the third prime number generates an exponent of 5; the fourth prime number generates an exponent of 4; the fifth and sixth prime numbers generate an exponent of 3; the seventh and eight prime numbers generate an exponent of 4; and the ninth prime number generates an exponent 5. The values for the exponents are all below the value selected for the maximum exponent in the initialization stage. As a result of the compression cycle, the compressed data to be transmitted is in the form of a 1, which corresponds to the number of faults encountered during the compression cycle, and nine numbers corresponding to the exponential values for each of the prime numbers used in the compression cycle.

This data is converted into binary form at step S124, with the first eight bits corresponding to the fault value and the subsequent set of nine 3 bit values corresponding to the exponents obtained for each prime number. The compressed data to be transmitted is 35 bits in length, as shown in block R. The original data stream converts to a 103 bit binary stream. A comparison of the two binary data stream, results in a 2.94 to 1 compression ratio. Decompression of the data by the receiving station is achieved using the following mathematical expression:

$$(2^0)*(3^4)*(5^5)*(7^4)*(11^3)*(13^3)*(17^4)*(19^4)*(23^5)+1$$

Communication System

Figure 5:
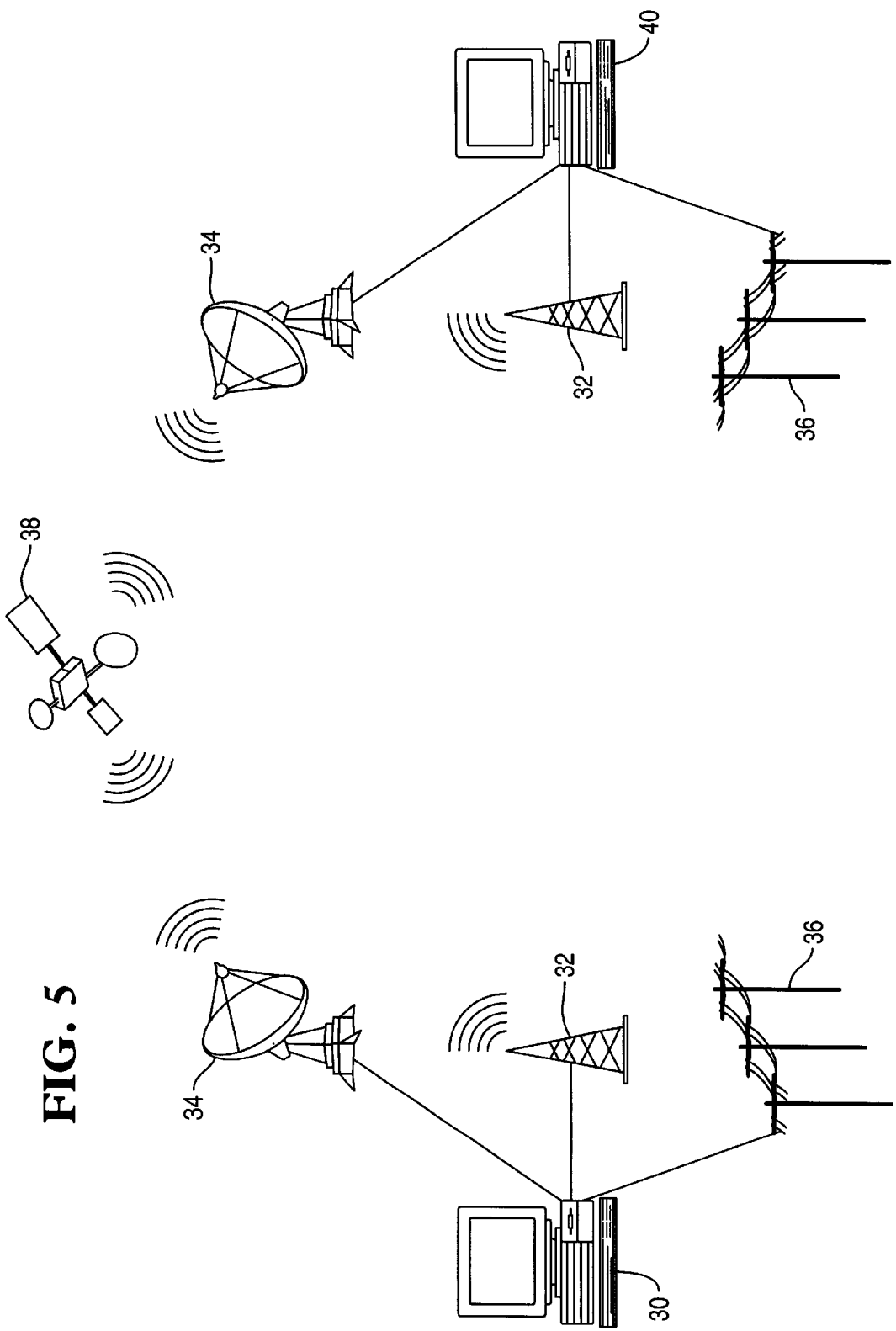
FIG. 5 is a block diagram illustrating a system of transmitting compressed data according to the present invention.

Turning now to FIG. 5, a system is shown for transmitting compressed data. The system includes a first station 30 and a second station 40. Each station 30,40 includes an encoder, a data transmitting device, a data receiving device, and a decoder. The encoder and the decoder may be in the form of standard hardware or communication devices for data transmission and reception such as a transmitter/receiver, or may be in the form of a digital computer executing a sequence of program instructions to cause a processor to perform the necessary transmit and receive operations.

The encoder is configured to construct a header containing the compression parameters to be used for the compression cycle. Hence, the header includes a key parameter corresponding to the number of prime numbers used in the compression routine, a limit parameter corresponding to the largest value for the exponents, a size parameter corresponding to the largest set of bytes to be compressed in an individual cycle, and a fault parameter corresponding to the number of times the compression routine fails. The encoder is also configured to segment the data stream, if necessary, into one or more data blocks according to the value of the size parameter.

The encoder includes a compression buffer to store the value of the data. The compression buffer may be in the form of random access memory (RAM), magnetic storage media, etc. The encoder compresses the data blocks by successively dividing the value of the compression buffer by the prime numbers and subsequently generates an exponent parameter associated with each of the prime numbers. If multiple data blocks are used, the encoder will also reassemble the data blocks to form a single compressed data stream. Additionally, the encoder will attend to appropriate conversion of the data from binary to decimal form and vice versa. The data stream is then transmitted by the transmitting device to the receiving device across a communication link. The data transmitting device may be in the form of a transmitter 32, a microwave antenna 34, a modem (not shown) coupled to the computer system to operate over a conventional telephone line 36, satellite transmission 38, etc. Accordingly, data transmission can be wireless, optical, physical, etc.

Once the data is received by the receiving device of the second station 40, the decoder retrieves the header and the compressed data stream. The compression parameters are decoded from the header and the decompression cycle begins. The decoder segments the compressed data stream into one or more compressed data blocks based on information retrieved from the size parameter. The decoder includes a construction buffer and an analysis buffer which are used to decompress the data. As with the compression buffer, the construction buffer and the analysis buffer may be in the form of RAM, magnetic media, etc.

Each compressed data block is moved into the analysis buffer and decompressed by raising each prime number to the exponential value obtained during the compression cycle and taking the product. The result of this process is a plurality of decompressed data blocks. The decoder then reassembles the decompressed data blocks into the original data stream without any loss.

The system illustrated in FIG. 5 is suited for operation over various communication networks, including packet and circuit switching networks. Additionally, the system may be used in real time for interactive data transfer and communication. In such a configuration, a first and second station are again used. Each station includes an encoder, a data transmitting device, a data receiving device and a decoder. The first station constructs a first header which is transmitted to the second station. The decoder of the second station retrieves compression parameters from the first header and sends an acknowledgement to the first station. The acknowledgement may also include a second header containing compression parameters generated by the second station if bi-directional communication is desired. Once acknowledgement is received, the first station begins to compress and transmit data blocks to the second station. The first station may also receive and decompress data blocks received from the second station. Similarly, the second station receives and decompresses data blocks from the first station, and compresses and transmits data blocks to the first station. Operation of the communication system in real time may be full or half duplex.

This same technique can be used in cases where the transmission media is a bus, e.g., between a CPU and a disc, so that storage space in the disc can be reduced.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of compressing data comprising the steps: selecting at least one compression parameter including a prime parameter corresponding to a predetermined number of prime numbers to be used; and compressing the data into a compressed data block based on the at least one compression parameter, and constructing a header containing the at least one compression parameter, transferring the header to a compression buffer, and transferring the data stream to the compression buffer.

2. The method of claim 1, further comprising the step of appending the header to the compressed data block.

3. The method of claim 1, wherein the step of selecting includes the step of inputting, by a user, at least one compression parameter.

4. The method of claim 1, wherein the step of selecting includes the step of determining, by a processing unit associated with the system, at least one compression parameter based on predetermined conditions.

5. The method of claim 1, wherein the step of selecting further includes the steps of:
   selecting a limit parameter corresponding to a predetermined exponent value to be used in compressing the data stream; and
   selecting a size parameter corresponding to the largest set of bytes to be compressed during each cycle.

6. The method of claim 5, further comprising the steps of:
   segmenting the data stream, prior to the step of transferring, into one or more data blocks according to the size parameter;
   transferring the one or more data blocks to the compression buffer; and
   assembling one or more compressed data blocks, resulting from the step of compressing, into a compressed data stream.

7. The method of claim 1, wherein the step of compressing further includes the steps of:
   repeatedly dividing the contents of the compression buffer until a remainder is obtained or the quotient is less than the largest prime number, by each successive prime number;
   generating an exponential parameter for each prime number, the exponential parameter being indicative of the number of repetitions performed using each prime number during the step of repeatedly dividing;
   compensating the contents of compression buffer to successfully perform the step of repeatedly dividing without obtaining a remainder, based on the prime parameter selected; and
   generating a fault parameter indicative of the number of times the step of compensating is performed.

8. A method of decompressing compressed data comprising the steps of:
   retrieving at least one compression parameter from a header associated with the compressed data, including a prime parameter corresponding to a predetermined number of prime numbers used to compress the data;
   decompressing the data into a decompressed data block according to the at least one of compression parameter; and
   transferring the compressed data to an analysis buffer.

9. The method of claim 8, further comprising the steps of:
   segmenting the compressed data, prior to the step of transferring, into one or more compressed data blocks in accordance with the at least one compression parameter retrieved from the header; and
   assembling one or more decompressed data blocks, resulting from the step of decompressing, into a data stream.

10. The method of claim 8, wherein the step of decompressing further includes the steps of:
    generating a plurality of evaluated prime numbers by raising each prime number, to an exponential value corresponding to the exponential parameters generated for the compressed data block currently stored in an analysis buffer;
    calculating the product of the evaluated prime number;
    storing the product of the evaluated prime numbers in a construction buffer; and
    adding a value indicated by a fault parameter and an Adjustment Algorithm associated with the compressed data block to the product of the evaluated prime numbers.

11. A system for transmitting compressed data comprising: an encoder for retrieving a data stream to be transmitted, said encoder being configured to: construct a header containing compression parameter, including a prime parameter corresponding a predetermined number of prime numbers to be used, a limit parameter corresponding to a predetermined exponent value, and a size parameter corresponding to the largest set of bytes to be compressed during each cycle, segment the data stream into one or more data blocks of predetermined length, according to said size parameter, upon determining the size of the data stream exceeds the size parameter, compress the one or more data blocks according to the at least one compression parameter to form one or more compressed data blocks, generate an exponential parameter for each of said one or more compressed data blocks, assemble the one or more compressed data blocks into a compressed data stream; a data transmitting device for transmitting said header and said compressed data stream; a data receiving device for receiving said header and said compressed data stream from said data transmitting device; and a decoder for retrieving said header and said compressed data stream from said receiver device, said decoder being configured to: retrieve the at least one compression parameter from said header, segment said compressed data stream into one or more compressed data blocks according to the compression parameters received, decompress the one or more compressed data blocks to obtain one or more decompressed data blocks, and reassemble the one or more decompressed data blocks, into the data stream retrieved by the encoder.

12. A communication system comprising:

at least two stations, each station including:

an encoder for retrieving a data stream, said encoder being configured to:

construct a header containing a plurality of compression parameters, including a prime parameter corresponding a predetermined number of prime numbers to be used, a limit parameter corresponding to a predetermined exponent value, and a size parameter corresponding to the largest set of bytes to be compressed during each cycle, segment the data stream into one or more data blocks of predetermined length according to said size parameter, compress the one or more data blocks according to said prime parameter;

a data transmitting device for transmitting said header and said compressed data blocks to another one of said at least two stations;

a data receiving device for receiving said header and each of said compressed data blocks from another one of said at least two stations; and a decoder for retrieving said header and said compressed data blocks from said data receiving device, said decoder being configured to:

retrieve compression parameters from said header, decompress each of the one or more compressed data blocks to obtain one or more corresponding decompressed data blocks, and convert the one or more decompressed data blocks into a data stream.

13. A method of transmitting compressed data comprising the steps:

constructing, by a first station, a header containing a plurality of compression parameters, including a prime parameter corresponding to a predetermined of prime numbers to be used, a limit parameter corresponding to a predetermined exponent value, and a size parameter corresponding to the largest set of bytes to be compressed during each cycle;

transmitting the header to a second station;

acknowledging, by the second station, successful receipt of the header;

segmenting a data stream, by the first station, data stream into one or more data blocks of predetermined length according to the size parameter;

compressing the one or more data blocks according to the compression parameters to form one or more compression data blocks;

sequentially transmitting the one or more compression data blocks to the second station;

retrieving, by the second station, compression parameters from the header;

decompressing the one or more compressed data blocks to obtain one or more decompressed data blocks; and converting the one or more decompressed data blocks into a data stream.

* * * * *

UNITED STATES PATENT AND TRADEMARK OFFICE
CERTIFICATE OF CORRECTION

PATENT NO. : 6,373,986 B1
DATED : April 16, 2002
INVENTOR(S) : Fink, R.

It is certified that error appears in the above-identified patent and that said Letters Patent is hereby corrected as shown below:

Column 9,
Line 60, after "mined" insert -- maximum --

Column 10,
Line 27, after "data;", insert as new line -- transferring the compressed data to an analysis buffer, and; --
Line 30, delete "transferring the compressed data to an analysis buffer."
Line 42, after "number" delete ",".
Line 44, delete "an" and insert -- the --
Line 45, after "buffer;" insert -- therefore --

Column 11,
Line 24, after "predetermined" insert -- maximum --

Column 12,
Line 16, after "predetermined" insert -- maximum --

Signed and Sealed this

Twenty-second Day of February, 2005

JON W. DUDAS
*Director of the United States Patent and Trademark Office*